(12) United States Patent
Yamasaki et al.

(10) Patent No.: US 11,201,803 B2
(45) Date of Patent: Dec. 14, 2021

(54) ELECTRONIC CONTROL UNIT

(71) Applicant: TOYOTA JIDOSHA KABUSHIKI KAISHA, Toyota (JP)

(72) Inventors: Yasuhiro Yamasaki, Toyota (JP);
Toshio Kawamura, Toyota (JP);
Nobuyuki Nakagawa, Toyota (JP);
Yoshitaka Kaseda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/238,356

(22) Filed: Jan. 2, 2019

(65) Prior Publication Data
US 2019/0245765 A1    Aug. 8, 2019

(30) Foreign Application Priority Data

Feb. 8, 2018    (JP) .............................. JP2018-020910

(51) Int. Cl.
*H04L 12/26*    (2006.01)
*G06F 9/30*    (2018.01)
(Continued)

(52) U.S. Cl.
CPC .......... *H04L 43/0805* (2013.01); *G05B 19/04* (2013.01); *G06F 9/3004* (2013.01);
(Continued)

(58) Field of Classification Search
CPC ... H04L 67/12; H04L 67/1097; H04L 1/0002; H04L 1/0041; H04L 5/0064; H04L 1/18; H04L 2209/88; H04L 63/0428; G05B 19/4183; G05B 23/0221; G05B 13/028; G05B 19/4184; G05B 19/41845
See application file for complete search history.

(56) References Cited

U.S. PATENT DOCUMENTS 8,498,938 B1 *    7/2013    Bierschwale .......... G06Q 40/02
705/1.1
8,890,673 B2 *    11/2014    Catten ............... H04M 1/72463
340/439

(Continued)

FOREIGN PATENT DOCUMENTS

JP    H11-027312 A    1/1999
JP    2007-081484 A    3/2007
(Continued)

*Primary Examiner* — Michael A Keller
*Assistant Examiner* — Thao D Duong
(74) *Attorney, Agent, or Firm* — Oliff PLC

(57) ABSTRACT

An object of the present invention is to avoid the situation where data to be transmitted have to be discarded, even when a network to which the data is to be transmitted is unavailable. The electronic control unit has: a determination part that executes a first determination process for determining whether a network to which data is to be transmitted is available or not; and a transmission part that executes a first transmission process for transmitting the data to the network when it is determined that the network is available, and executes a storage process for storing the data in a storage medium when it is determined that the network is unavailable. The electronic control unit executes the same processes for another network as well.

6 Claims, 2 Drawing Sheets

(51) Int. Cl.
*G05B 19/04* (2006.01)
*H04W 72/12* (2009.01)
*H04L 12/70* (2013.01)

(52) U.S. Cl.
CPC ............. *H04L 47/00* (2013.01); *H04W 72/12* (2013.01); *H04L 43/0811* (2013.01)

(56) References Cited

U.S. PATENT DOCUMENTS

| | | | | |
|---|---|---|---|---|
| 2001/0051863 | A1* | 12/2001 | Razavi | G01C 21/26 703/23 |
| 2004/0034684 | A1* | 2/2004 | Payne | G06Q 10/10 709/201 |
| 2007/0252734 | A1* | 11/2007 | Greiner | E02F 9/26 341/67 |
| 2008/0177460 | A1* | 7/2008 | Blackwood | G01C 21/26 701/118 |
| 2009/0119657 | A1* | 5/2009 | Link, II | G06F 8/65 717/171 |
| 2012/0232943 | A1* | 9/2012 | Myr | 705/7.13 |
| 2013/0006674 | A1* | 1/2013 | Bowne | G06Q 40/04 705/4 |
| 2015/0296019 | A1 | 10/2015 | Onishi et al. | |
| 2016/0012378 | A1* | 1/2016 | Inaba | G06Q 10/063114 705/7.15 |
| 2016/0134383 | A1* | 5/2016 | Banasky, Jr. | H04B 1/40 455/67.14 |
| 2017/0086084 | A1* | 3/2017 | Jarvis | H04W 24/10 |
| 2018/0013211 | A1* | 1/2018 | Ricci | H01Q 1/3266 |

FOREIGN PATENT DOCUMENTS

| | | |
|---|---|---|
| JP | 2008-187243 A | 8/2008 |
| JP | 2014-096630 A | 5/2014 |

\* cited by examiner

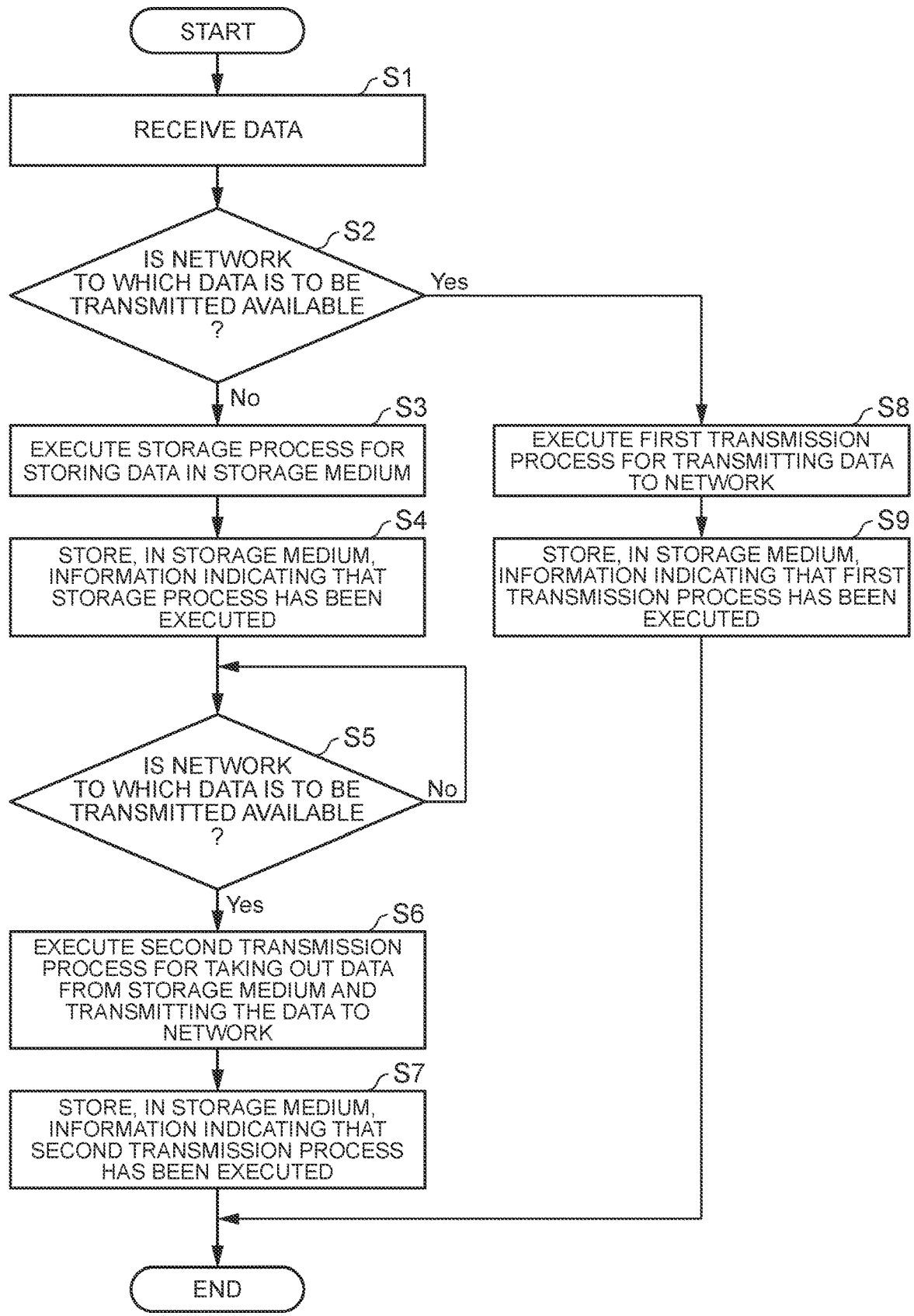

ELECTRONIC CONTROL UNIT

BACKGROUND

Field

The present invention relates to an electronic control unit.

Description of Related Art

Today's automobiles have a plurality of microcomputers called "electronic control units (ECU)" installed therein. These electronic control units control the operation of the automobile by exchanging data.

For example, Patent Publication JP-A-2007-081484 discloses a communication control unit that has: recording means for recording a data storage table in which, when data to be regularly transmitted to an on-vehicle LAN network can be received normally, the received latest data and/or standard data and the reception time thereof are stored in association with the transmission cycle of the data; abnormality determination means for determining that an abnormality has occurred when the data cannot be received normally in the transmission cycle of the data; and proxy transmission means for transmitting the latest data or standard data recorded in the data storage table to the on-vehicle LAN network when it is determined that the abnormality has occurred.

SUMMARY

However, in a case where the network to which the data is to be transmitted is unavailable, this communication control unit cannot transmit the data, in which case the data to be transmitted have to be discarded.

An object of the present invention, therefore, is to provide an electronic control unit that is capable of avoiding the situation where data to be transmitted have to be discarded, even when a network to which the data is to be transmitted is unavailable.

An electronic control unit according to one aspect of the present invention has: a determination part that executes a first determination process for determining whether a network to which data is to be transmitted is available or not; and a transmission part that executes a first transmission process for transmitting the data to the network when it is determined that the network is available, and executes a storage process for storing the data in a storage medium when it is determined that the network is unavailable.

The present invention can provide an electronic control unit that can avoid the situation where data to be transmitted have to be discarded, even when a network to which the data is to be transmitted is unavailable.

BRIEF DESCRIPTION OF DRAWINGS

FIG. 2 is a flowchart showing an example of processes executed by the electronic control unit according to the embodiment.

DETAILED DESCRIPTION

Figure 1:
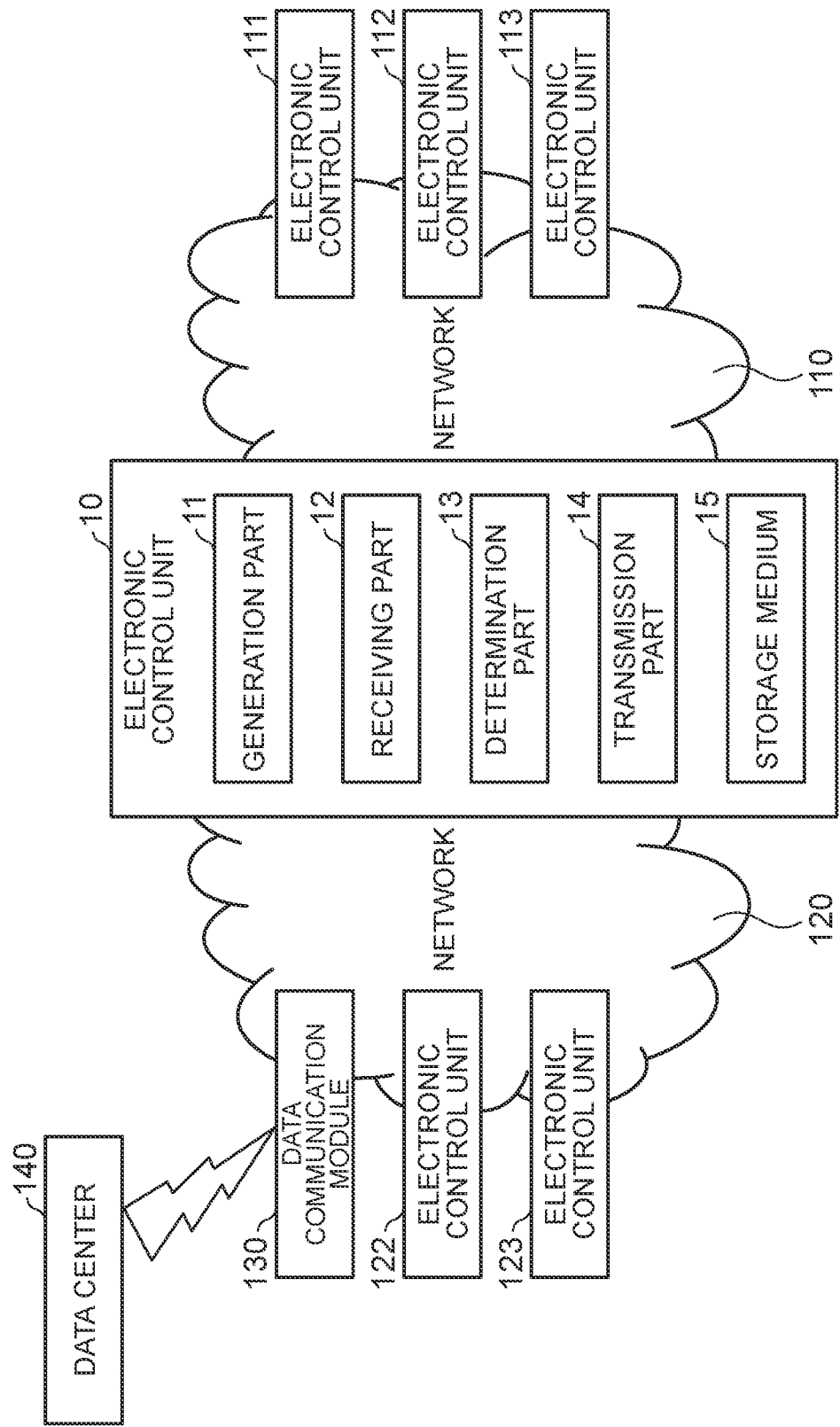
FIG. 1 is a diagram showing an example of an electronic control unit according to an embodiment, networks to which the electronic control unit is connected, and devices connected to these networks.

A preferred embodiment of the present invention is now described hereinafter with reference to the accompanying drawings. Note that, in the respective drawings, the components that are denoted the same reference numerals have the same or similar configurations.

An electronic control unit according to the embodiment is described with reference to FIG. 1. An electronic control unit 10 has a generation part 11, a receiving part 12, a determination part 13, a transmission part 14, and a storage medium 15. The electronic control unit 10 may simply be provided with at least the determination part 13 and the transmission part 14 and may have components other than those shown in FIG. 1. Furthermore, the electronic control unit 10 may utilize other devices that have equivalent functions for at least one of the components.

A network 110 is an in-vehicle network that connects the electronic control unit 10, an electronic control unit 111, an electronic control unit 112, and an electronic control unit 113 in a mutually communicable manner. The network 110 employs, for example, a controller area network (CAN) as a communication protocol and a battery power source as a power source and is activated when the battery power source is on.

The network 120 is an in-vehicle network that connects the electronic control unit 10, an electronic control unit 122, an electronic control unit 123, and a data communication module (DCM) 130 in a mutually communicable manner. The network 120 employs, for example, Ethernet® as a communication protocol and an ignition power source as a power source and is activated when the ignition power source is on. The ignition power source is on or off even when the battery power source is on.

The electronic control unit 10, the electronic control unit 111, the electronic control unit 112, the electronic control unit 113, the electronic control unit 122, and the electronic control unit 123 communicate with each other to respectively control components of an automobile such as the engine, brake, and sensors.

The data communication module 130 receives data transmitted to the network 120 by the electronic control unit 10, and transmits the data to a data center 140.

On the basis of the data acquired from the components controlled by the electronic control unit 10, the generation part 11 generates data to be transmitted to both the network 110 and the network 120, such as data indicating a vehicle speed and data for realizing time synchronization among the six electronic control units shown in FIG. 1. Processes executed by the electronic control unit 10 are described hereinafter using the network 110 as an example; however, the processes apply to the network 120 as well.

The receiving part 12 receives the data generated by the generation part 11.

The determination part 13 executes a first determination process for determining whether the network 110 to which the data is to be transmitted is available or not.

The network 110 being available means that the network 110 is being activated since the battery power source is on and that no failures are occurring therein. Occurrence of failures here means, for example, that the network 110 is in a state of link down due to noise or device failure. In a case where the network 110 is available, the data received by the electronic control unit 10 are transmitted normally to the network 110.

On the other hand, the network 110 being unavailable means that the network 110 is not activated since the battery power source is off or that failures are occurring therein. In a case where the network 110 is unavailable, the data received by the electronic control unit 10 are discarded without being transmitted to the network 110.

Therefore, for example, when the battery power source is on, the determination part 13 determines that the network 110 is available, and when the battery power source is off, the determination part 13 determines that the network 110 is unavailable. Alternatively, for example, in a case where the determination part 13 receives information indicating the occurrence of failure from devices constituting the network 110, the determination part 13 determines that the network 110 is unavailable. In a case where the determination part 13 does not receive such information, the determination part 13 determines that the network 110 is available.

When it is determined that the network 110 is available, the transmission part 14 executes a first transmission process for transmitting the data to the network 110, and when it is determined that the network 110 is unavailable, the transmission part 14 executes a storage process for storing the data in the storage medium 15. In a case where the transmission part 14 executes the first transmission process, the transmission part 14 stores, in the storage medium 15, information indicating that the first transmission process has been executed, as a process accompanying the first transmission process. In a case where the transmission part 14 executes the storage process, the transmission part 14 stores, in the storage medium 15, information indicating that the storage process has been executed, as a process accompanying the storage process.

In addition, following the execution of the storage process, the determination part 13 may execute a second determination process for determining whether the network 110 is available or not. When it is determined in the second determination process that the network 110 is available, the transmission part 14 executes a second transmission process for taking out the data from the storage medium 15 and transmitting the data to the network 110. In a case where the transmission part 14 executes the second transmission process, the transmission part 14 may store, in the storage medium 15, information indicating that the second transmission process has been executed, as a process accompanying the second transmission process. Note that the information indicating that the second transmission process has been executed may be overwritten on the information indicating that the storage process has been executed. Furthermore, it is preferred that the storage medium 15 have sufficient capacity to allow the transmission part 14 to execute the storage process and the second transmission process.

Favorable processes executed by the electronic control unit according to the embodiment are described next with reference to FIG. 2.

In step S1, the receiving part 12 receives the data.

In step S2, the determination part 13 determines whether the network 110 to which the data is to be transmitted is available or not. In a case where the determination part 13 determines that the network 110 is available (step S2: Yes), the process proceeds to step S8, and in a case where the determination part 13 determines that the network 110 is unavailable (step S2: No), the process proceeds to step S3.

In step S3, the transmission part 14 executes the storage process for storing the data in the storage medium 15.

In step S4, the transmission part 14 stores, in the storage medium 15, the information indicating that the storage process has been executed.

In step S5, the determination part 13 determines whether the network 110 to which the data is to be transmitted is available or not. In a case where the determination part 13 determines that the network 110 is available (step S5: Yes), the process proceeds to step S6, and in a case where the determination part 13 determines that the network 110 is unavailable (step S5: No), the process is put on standby until the determination part 13 determines that the network 110 is available.

In step S6, the transmission part 14 executes the second transmission process for taking out the data from the storage medium 15 and transmitting the data to the network 110.

In step S7, the transmission part 14 stores, in the storage medium 15, the information indicating that the second transmission process has been executed, and ends the process.

In step S8, the transmission part 14 executes the first transmission process for transmitting the data to the network 110.

In step S9, the transmission part 14 stores, in the storage medium 15, the information indicating that the first transmission process has been executed, and ends the process.

Note that the electronic control unit 10 does not have to execute at least any one of the steps S4, S7, and S9.

The embodiment has been described above as an example of the present invention. The electronic control unit 10 according to the embodiment determines whether the network 110 is available or not, and transmits data to the network 110 when it is determined that the network 110 is available, but stores the data in the storage medium 15 when it is determined that the network 110 is unavailable. Therefore, in a case where the network 110 is unavailable, the electronic control unit 10 can hold the data in the storage medium 15 instead of transmitting the data to the network 110. Consequently, the electronic control unit 10 can avoid a situation where the data to be transmitted to the network 110 have to be discarded.

Moreover, in a case where the first transmission process is executed, the electronic control unit 10 stores, in the storage medium 15, the information indicating that the first transmission process has been executed. In a case where the storage process is executed, the electronic control unit 10 stores, in the storage medium 15, the information indicating that the storage process has been executed. Therefore, the electronic control unit 10 can recognize that the first transmission process or the storage process has been executed.

Furthermore, after the execution of the storage process, the electronic control unit 10 determines whether the network 110 is available or not. In a case where it is determined in the second determination process that the network 110 is available, the electronic control unit 10 takes out the data from the storage medium 15 and transmits the data to the network 110. Therefore, the electronic control unit 10 can reliably transmit, to the network 110, the data that need to be transmitted thereto.

In addition, in a case where the second transmission process is executed, the electronic control unit 10 stores, in the storage medium 15, the information indicating that the second transmission process has been executed. Therefore, the electronic control unit 10 can recognize that the second transmission process has been executed.

Note that the electronic control unit 10 may be connected communicably to networks other than the network 110 and the network 120 to transmit data generated by the generation part 11, to these networks. In such a case, the electronic control unit 10 executes the processes described with reference to FIG. 2, for these networks.

Also, instead of transmitting data to both the network 110 and the network 120, the electronic control unit 10 may receive data from a network other than the network 120 and transmit the data to the network 120. In this case, for example, the electronic control unit 10 receives data from the network 110 by using the receiving part 12 and executes the processes described with reference to FIG. 2, for the network 120. In this case as well, the electronic control unit 10 may be connected to networks other than the network 110 and the network 120 and transmit, for example, the data received from the network 110, to these networks.

The network 110 and the network 120 can each employ any communication protocol such as CAN with flexible data-rate (CAN-FD), FlexRay®, or local interconnect network (LIN). The network 110 and the network 120 can also employ any power sources that turn on at different times, such as a battery power source, an accessory power source, or an ignition power source.

The present invention is not limited to the embodiment described above and therefore can be implemented in various other forms without departing from the gist of the present invention. Therefore, the embodiment described above is merely illustrative in all aspects and should not be interpreted in a restrictive manner. For example, the process steps described above can arbitrarily be executed in a different order or in parallel as long as no inconsistency is present in the details of each process.

What is claimed is:

1. A processor, installed in a vehicle, that is programmed to:
    connect with a first network and connect with a second network different from the first network;
    obtain data that is to be transmitted to the first network and the second network;
    determine whether the first network is available, and whether the second network is available;
    transmit the data to the first network, store the data in a storage medium so as to enable the data to be transmitted to the second network when the second network becomes available in response to determining that the first network is available and the second network is unavailable, and store information in the storage medium indicating that the data has been transmitted to the first network;
    determine whether the second network is available, when the data is stored in the storage medium; and
    transmit the data to the second network when the second network becomes available, and store information in the storage medium indicating that the data has been transmitted to the second network,
    wherein:
    the first network is a network based on a controller area network (CAN) standard, a first power source that provides power to the first network is a battery power source, the second network is a network based on an Ethernet standard, and a second power source that provides power to the second network is an ignition power source, or
    the first network is a network based on an Ethernet standard, a first power source that provides power to the first network is an ignition power source, the second network is a network based on a controller area network (CAN) standard, and a second power source that provides power to the second network is a battery power source.

2. The processor according to claim 1, wherein the first network and the second network are in-vehicle networks.

3. The processor according to claim 1, wherein the first network receives electric power from a first power source and the second network receives electric power from a second power source different from the first power source at different times.

4. A method of controlling a processor that is installed in a vehicle and which connects with a first network and a second network different from the first network:
    obtaining data that is to be transmitted to the first network and the second network;
    determining whether the first network is available, and whether the second network is available;
    transmitting the data to the first network, storing the data in a storage medium so as to enable the data to be transmitted to the second network when the second network becomes available in response to determining that the first network is available and the second network is unavailable, and storing information in the storage medium indicating that the data has been transmitted to the first network;
    determining whether the second network is available, when the data is stored in the storage medium; and
    transmitting the data to the second network when the second network becomes available, and storing information in the storage medium indicating that the data has been transmitted to the second network,
    wherein:
    the first network is a network based on a controller area network (CAN) standard, a first power source that provides power to the first network is a battery power source, the second network is a network based on an Ethernet standard, and a second power source that provides power to the second network is an ignition power source, or
    the first network is a network based on an Ethernet standard, a first power source that provides power to the first network is an ignition power source, the second network is a network based on a controller area network (CAN) standard, and a second power source that provides power to the second network is a battery power source.

5. The method according to claim 4, wherein the first network and the second network are in-vehicle networks.

6. A non-transitory computer-readable storage medium storing a program that, when executed, causes a processor that is installed in a vehicle and which connects with a first network and a second network different from the first network to execute steps comprising:
    obtaining data that is to be transmitted to the first network and the second network;
    determining whether the first network is available, and whether the second network is available;
    transmitting the data to the first network, storing the data in a storage medium so as to enable the data to be transmitted to the second network when the second network becomes available in response to determining that the first network is available and the second network is unavailable, and storing information in the storage medium indicating that the data has been transmitted to the first network;
    determining whether the second network is available, when the data is stored in the storage medium; and
    transmitting the data to the second network when the second network becomes available, and storing information in the storage medium indicating that the data has been transmitted to the second network,
    wherein:
    the first network is a network based on a controller area network (CAN) standard, a first power source that provides power to the first network is a battery power source, the second network is a network based on an Ethernet standard, and a second power source that provides power to the second network is an ignition power source, or the first network is a network based on an Ethernet standard, a first power source that provides power to the first network is an ignition power source, the second network is a network based on a controller area network (CAN) standard, and a second power source that provides power to the second network is a battery power source.

* * * * *